United States Patent
Su et al.

(10) Patent No.: US 11,070,301 B2
(45) Date of Patent: Jul. 20, 2021

(54) LEARNING-BASED WIRELESS TRANSMISSION PARAMETER ADAPTATION BASED ON CLIENT ACTIVITY DETECTION

(71) Applicant: Cisco Technology, Inc., San Jose, CA (US)

(72) Inventors: Shi Su, Houston, TX (US); Kaidong Wang, Los Angeles, CA (US); Wai-Tian Tan, Sunnyvale, CA (US); Xiaoqing Zhu, Austin, TX (US); Robert Edward Liston, Menlo Park, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 153 days.

(21) Appl. No.: 16/292,998

(22) Filed: Mar. 5, 2019

(65) Prior Publication Data
US 2020/0287639 A1  Sep. 10, 2020

(51) Int. Cl.
*H04B 17/336* (2015.01)
*H04B 7/0452* (2017.01)
(Continued)

(52) U.S. Cl.
CPC ............ *H04B 17/336* (2015.01); *G06N 3/08* (2013.01); *H04B 7/0452* (2013.01);
(Continued)

(58) Field of Classification Search
CPC . H04L 1/0003; H04L 1/0061; H04L 25/0224; H04B 17/336; H04B 7/0452; H04B 7/0625; G06N 20/00; G06N 3/08
(Continued)

(56) References Cited

U.S. PATENT DOCUMENTS

| | | | |
|---|---|---|---|
| 6,795,686 B2 | 9/2004 | Master et al. | |
| 7,359,771 B2 | 4/2008 | Soulie et al. | |

(Continued)

OTHER PUBLICATIONS

Xiufeng Xie et al., "Scalable User Selection for MU-MIMO Networks", IEEE INFOCOM 2014—IEEE Conference on Computer Communications, Apr. 27-May 2, 2014, 9 pages.
(Continued)

*Primary Examiner* — Gbemileke J Onamuti
(74) *Attorney, Agent, or Firm* — Edell, Shapiro & Finnan, LLC

(57) ABSTRACT

An access point (AP) is configured to transmit packets to a client device over a communication channel. The AP determines a motion indictor indicative of motion of the client device based on a sequence of channel state information measurements, and measures a signal-to-noise ratio (SNR). The AP selects a transmission parameter among candidate transmission parameters using a learning-based algorithm based on observation parameters including the motion indicator, the SNR, and a device identifier for the client device. The AP employs the transmission parameter to transmit packets to the client device, and measures a transmission performance associated with the transmission parameter based on the transmitted packets. The AP updates the learning-based algorithm based on the observation parameters and the transmission performance for a next pass through the selecting, the employing, and the measuring.

20 Claims, 10 Drawing Sheets

(51) Int. Cl.
- H04B 7/06 (2006.01)
- H04L 1/00 (2006.01)
- H04L 25/02 (2006.01)
- G06N 3/08 (2006.01)
- G06N 20/00 (2019.01)

(52) U.S. Cl.
CPC ......... *H04B 7/0626* (2013.01); *H04L 1/0003* (2013.01); *H04L 1/0061* (2013.01); *H04L 25/0224* (2013.01); *G06N 20/00* (2019.01)

(58) Field of Classification Search
USPC ...................................................... 370/329
See application file for complete search history.

(56) References Cited

U.S. PATENT DOCUMENTS

| | | |
|---|---|---|
| 7,474,676 B2 | 1/2009 | Tao et al. |
| 7,701,975 B1 | 4/2010 | Tsang et al. |
| 8,457,546 B2 | 6/2013 | Mahajan et al. |
| 8,559,887 B2 | 10/2013 | Stager et al. |
| 9,743,258 B1 | 8/2017 | Elsherif et al. |
| 2007/0064785 A1 | 3/2007 | Alapuranen |
| 2008/0042898 A1 | 2/2008 | Sharma |
| 2009/0247186 A1 | 10/2009 | Ji et al. |
| 2009/0262692 A1 | 10/2009 | Olszewski |
| 2010/0131751 A1 | 5/2010 | Reznik et al. |
| 2010/0142633 A1 | 6/2010 | Yu et al. |
| 2010/0215108 A1 | 8/2010 | Balachandran et al. |
| 2011/0019557 A1 | 1/2011 | Hassan et al. |
| 2011/0026623 A1 | 2/2011 | Srinivasa et al. |
| 2012/0170565 A1 | 7/2012 | Seok |
| 2013/0177115 A1 | 7/2013 | Yang et al. |
| 2013/0301551 A1 | 11/2013 | Ghosh et al. |
| 2015/0078291 A1 | 3/2015 | Gñer |
| 2015/0245360 A1 | 8/2015 | Gao et al. |
| 2016/0249398 A1 | 8/2016 | Yankevich et al. |
| 2016/0345343 A1 | 11/2016 | Elsherif et al. |
| 2018/0324801 A1 | 11/2018 | Sampathkumar et al. |
| 2019/0277957 A1* | 9/2019 | Chandrasekhar ......... G01S 1/38 |
| 2020/0107366 A1* | 4/2020 | Kela ................. H04W 72/1263 |
| 2020/0204477 A1* | 6/2020 | Rahman .................. H04L 45/22 |

OTHER PUBLICATIONS

Dan Tan et al., "Learning One Universal Machine Learning Model for Wi-Fi Under Diverse Devices and Environments", Nov. 14, 2018, 7 pages.

Charlie Demerjian, "Qualcomm talks about 802.11ac MU-MIMO details How the tech works it's magic on a low level", https://semiaccurate.com/2015/04/27/qualcomm-talks-802-11ac-mu-mimo-details/, Apr. 27, 2015, 9 pages.

Li Sun et al., "Motion Detection in WLANs using PHY Layer Information", https://cse.buffalo.edu/faculty/dimitrio/research/csi.html, downloaded Mar. 5, 2019, 1 page.

Sanjib Sur et al., "Practical MU-MIMO User Selection on 802.11ac Commodity Networks", ISBN 978-1-4503-4226-1/16/10, MobiCom '16 Proceedings of the 22nd Annual International Conference on Mobile Computing and Networking, http://doi.acm.org/10.1145/2973750.2973758, Oct. 3-7, 2016, 13 pages.

Wei-Liang Shen et al., "SIEVE: Scalable user grouping for large MU-MIMO systems", 2015 IEEE Conference on Computer Communications (INFOCOM), Apr. 26-May 1, 2015, 9 pages.

Kamran Ali et al., "Keystroke Recognition Using WiFi Signals", Proc. 21st Annual International Conference on Mobile Computing and Networking (MobiCom '15), http://doi.acm.org/10.1145/2789168.2790109, Sep. 7, 2015, 13 pages.

Fadel Adib et al, "See Through Walls with Wi-Fi!", ACM SIGCOMM Conference (SIGCOMM '13), http://doi.acm.org/10.1145/2486001.2486039, Aug. 12-16, 2013, 12 pages.

Khalifa Salim, "Channel Prediction Based Adaptive Packet Length for Wireless Communications", ISSN:2319-7900, International Journal of Advance Computer Technology, vol. 3, No. 1, Jan. 2014, https://www.researchgate.net/publication/310273100_CHANNEL_PREDICTION_BASED_ADAPTIVE_PACKET_LENGTH_FOR_WIRELESS_COMMIUNICATIONS, 7 pages.

IEEE, " 802.11n-2009—IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput", https://ieeexplore.ieee.org/document/5307322, Oct. 28, 2019, 536 pages.

IEEE, "802.11ac-2013—IEEE Standard for Information technology—Telecommunications and information exchange between systemsLocal and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz.", https:ieeexplore.ieee.org/document/6687187, Dec. 18, 2018.

\* cited by examiner

LEARNING-BASED WIRELESS TRANSMISSION PARAMETER ADAPTATION BASED ON CLIENT ACTIVITY DETECTION

TECHNICAL FIELD

The present disclosure relates to transmission parameter adaptation in wireless networks.

BACKGROUND

A Wi-Fi™ wireless local area network includes a wireless access point (AP) configured to communicate with one or more wireless client devices over respective communication channels. It is more challenging to transmit successfully to the client device when the client device is moving compared to when the client device is stationary. Nevertheless, conventional AP algorithms select physical (i.e., PHY) layer transmission parameters and link layer transmission parameters for transmission to the client devices, without explicitly taking into account client mobility (i.e., client motion). The transmission parameters include, but are not limited to, PHY-rate, single spatial stream, multiple spatial streams, single user (SU) multiple-input and multiple-output (MIMO) (SU-MIMO) operation, and multiple user (MU) MIMO (MU-MIMO) operation. Selecting the transmission parameters without considering client mobility (also referred to as client "activity") prevents the AP from selecting transmission parameters for successful transmission, e.g., to achieve a highest transmission throughput with minimum packet errors on receive, under different mobility conditions.

DESCRIPTION OF EXAMPLE EMBODIMENTS

Overview

An access point (AP) is configured to transmit packets to a client device over a communication channel used by the client device. The AP determines a motion indictor indicative of motion of the client device based on a sequence of channel state information measurements, and measures a signal-to-noise ratio (SNR) of the communication channel. The AP selects a transmission parameter among candidate transmission parameters using a learning-based algorithm based on observation parameters including the motion indicator, the SNR, and a device identifier for the client device. The AP employs the transmission parameter to transmit packets to the client device, and measures a transmission performance associated with the transmission parameter based on the transmitted packets. The AP updates the learning-based algorithm based on the observation parameters and the transmission performance for a next pass through the selecting, the employing, and the measuring.

Example Embodiments

Figure 1:
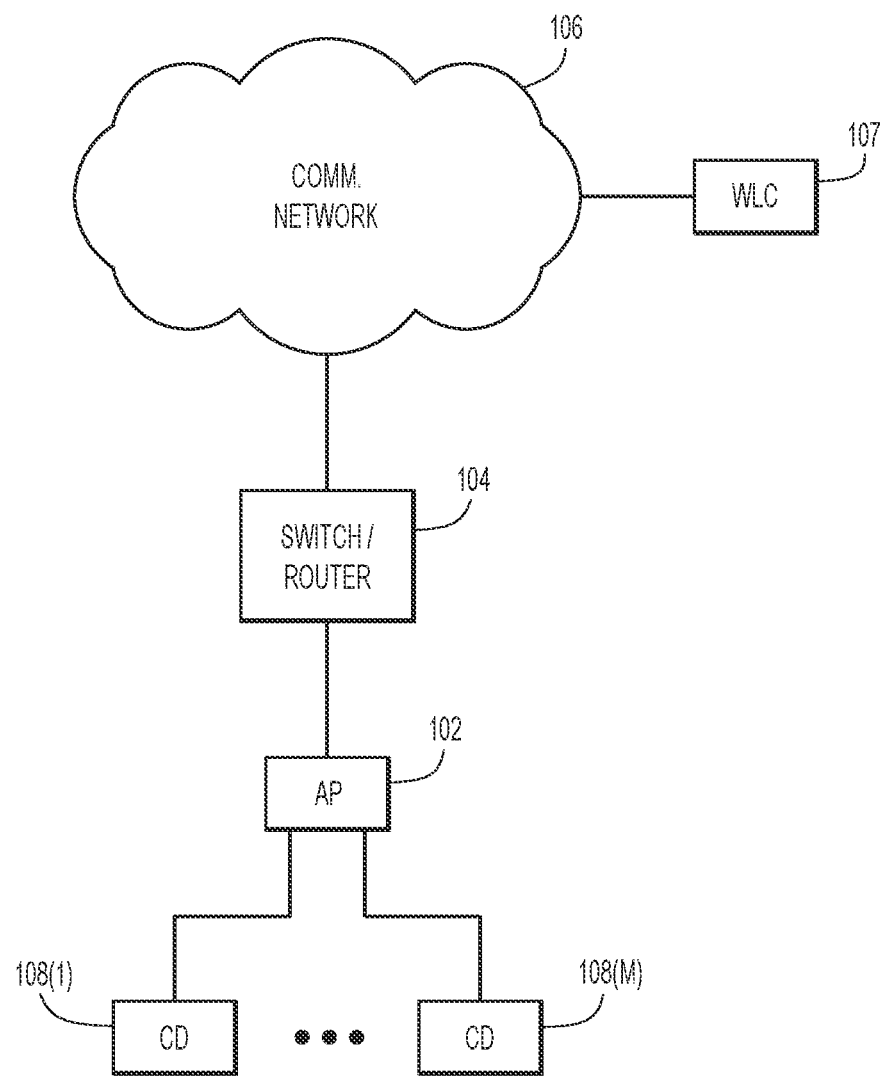
FIG. 1 is an illustration of a wireless network environment in which embodiments directed to selecting and updating transmission parameters at a wireless access point (AP) using a learning-based algorithm may be implemented, according to an example embodiment.

With reference to FIG. 1, there is an illustration of an example wireless network environment 100 in which embodiments directed to selecting and updating transmission parameters at a wireless access point using a learning-based algorithm may be implemented. Network environment 100 includes a wireless access point (AP) 102, a router or switch 104 configured to connect the AP with a communication network 106, and a wireless local area network (LAN) controller (WLC) 107 to control the AP. Communication network 106 may include one or more LANs and one or more wide area networks (WANs), such as the Internet. Network environment 100 also includes wireless client devices (CDs) 108(1)-108(M) (collectively referred to as client devices 108) configured to communicate wirelessly with AP 102 to gain access to network 106 under control of WLC 107. To this end, AP 102 may provide client devices 108 access to network 106 via respective wireless access links or communication channels in accordance with any of the IEEE 802.11 protocols, for example.

AP 102 transmits packets to (and receives packets from client devices 108) in accordance with physical (i.e., PHY) layer and link layer protocols implemented by the AP. AP 102 also has the flexibility to select PHY layer parameters and link layer parameters (collectively referred to as "transmission parameters") with which to configure the PHY layer protocol and the link layer protocol for per-packet transmissions to client devices 108. Example transmission parameters that may be selected for per-packet transmission include, but are not limited to, a modulation and coding (MCS) index (which represents a combination of modulation and channel coding, guarding interval, and various other parameters), a number of spatial streams, SU-MIMO operation, and MU-MIMO operation.

When AP 102 establishes a respective communication channel with a client device 108(i), transmission properties of the communication channel may be represented by channel state information (CSI) and a signal-to-noise ratio (SNR) associated with the communication channel. CSI, which may be determined by AP 102 individually or with assistance from client device 108(i), represents a combined effect of scattering, fading, and a signal power decay with distance in the communication channel, for example. Conventional AP transmission algorithms do not select the transmission parameters based on prescreening of the communication channel for CSI and SNR. Typically, the conventional AP transmission algorithms search for "best" transmission parameters in a reactive manner, via trial-and-error over multiple packets. Such "reactive adaptation" occurs afresh without remembering and learning from past experiences. Also, reactive adaptation does not take into account differences between client devices 108, i.e., between devices with different hardware (e.g., chipset in use) and software (e.g., iOS vs. Android) models.

Embodiments presented herein recognize that significant changes may occur in CSI and in SNR over time as a client device transitions from stationary to moving and vice versa, and that transmission parameters should also change to account for the changes in the CSI and the SNR, in order to maintain a maximum transmission throughput with minimum packet errors over time, for example. Additionally, the embodiments recognize that device type has an impact on transmission throughput for a given transmission parameter. Accordingly, the embodiments use a highly informed learning-based approach to select a transmission parameter. The learning-based approach selects a "best" transmission parameter for a given condition of a communication channel, as defined by a combination of CSI, SNR, and device type, based on training or learning from previously observed transmissions over the communication channel. The term "best" means a transmission parameter that results in a high efficiency of air time usage (i.e., "air time usage efficiency") representing a high aggregate transmission throughput with low packet error rate relative to other transmission parameters that cannot achieve as high an efficiency of air time usage. In an example, airtime usage efficiency may be defined as successful-throughput (i.e., an amount of packets successfully delivered, rather than sent) over resources used. For example, in one second, an AP may deliver 100 MB to only one client device using SU-MIMO, but may alternatively simultaneously deliver 50 MB each to three client devices under MU-MIMO. The air time usage efficiency for SU-MIMO is then 100/1, but the air time usage efficiency for MU-MIMO is 50/(⅓)=150.

The learning may be based either on a performance estimation function "Q" (referred to in the ensuing description more simply as a "performance function") or directly based on a policy function "π" that probabilistically maps observed conditions, e.g., CSI, SNR, and device type, to a recommended choice or selection of a transmission parameter.

In the ensuing description, first, a generalized learning-based algorithm for selecting and updating a PHY layer or link layer transmission parameter in an AP using a learning-based algorithm is described in connection with FIGS. 2-4. Second, table-based and neural network-based performance functions used by the learning-based algorithm are described in connection with FIGS. 5 and 6. Third, prescreening of client devices for MU-MIMO grouping (i.e., predictive grouping for MU-MIMO transmission) using the learning-based algorithm is described. Finally, a representative access point and a comparative performance model are described.

Generalized Learning-Based Algorithm

Figure 2:
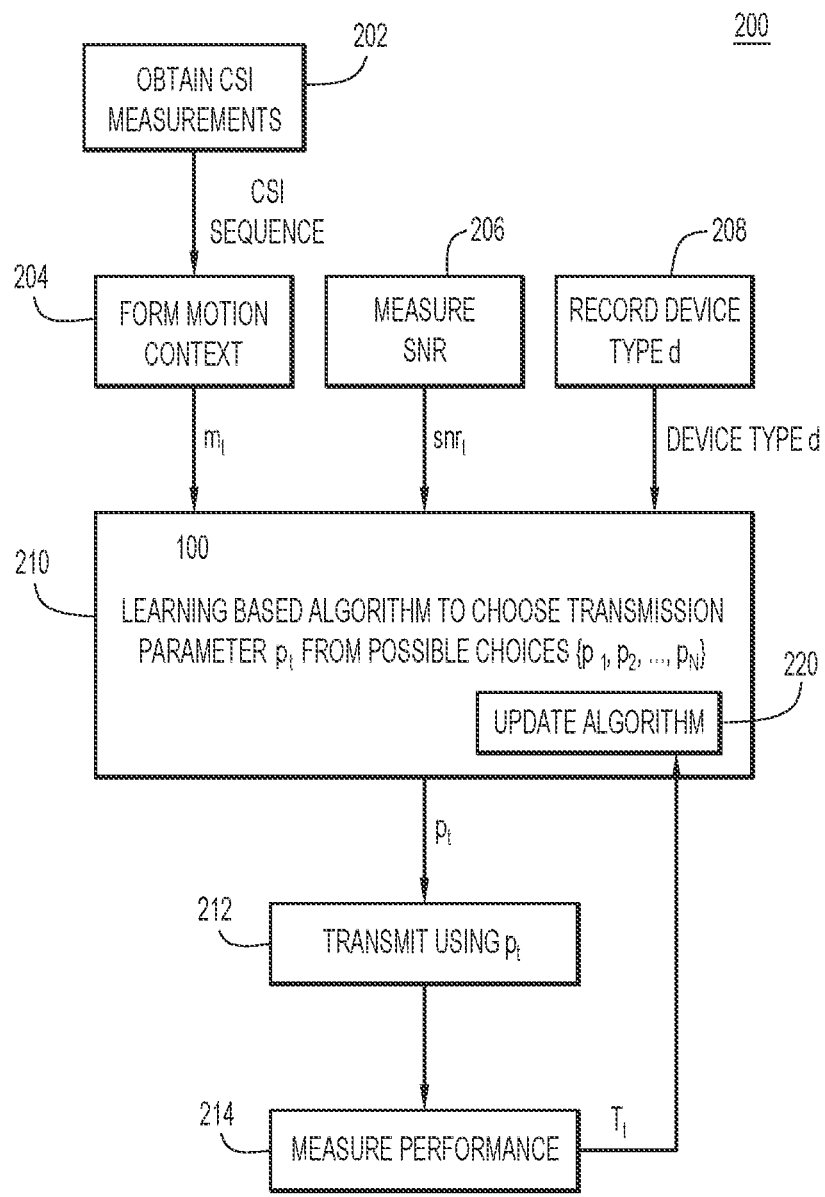
FIG. 2 is a flowchart of a generalized method of selecting and updating a transmission parameter using a learning-based algorithm, performed by the AP, according to an example embodiment.

With reference to FIG. 2, there is a flowchart of an example generalized method 200 of selecting and updating a transmission parameter using a learning-based algorithm, performed primarily by AP 102. Method 200 assumes AP 102 is configured to transmit packets to client devices 108, and receive packets from the client devices, over respective communication channels, as described above. AP 102 performs method 200 with respect to each client device 108(i) and the respective communication channel over which the AP communicates with the client device.

At 202, AP 102 obtains a sequence of CSI measurements for the communication channel associated with client device 108(i), and provides the sequence of CSI measurements to next operation 204. AP 102 may obtain the CSI measurements itself, or with assistance from client device 108(i), using any known or hereafter developed technique for obtaining CSI measurements at an access point. For example, there are at least two types of CSI that may be used, including explicit CSI and implicit CSI. Explicit CSI measures the communication channel from AP 102 to client device 108(i). Explicit CSI is measured at client device 108(i), compressed, and sent to AP 102 as part of an 802.11ac sounding process. That is, AP 102 transmits to client device 108(i) channel sounding packets, the client device measures CSI based on the sounding packets, compresses the measured CSI, and then transmits the compressed CSI to the AP. Implicit CSI is uncompressed and is measured at AP 102 for upstream packets from client device 108(i).

At 204, AP 102 determines a motion indictor ($m_t$) indicative of motion of client device 108(i). The motion indicator indicates an extent to which client device 108(i) is moving, e.g., whether client device 108(i) is moving or is not moving, how likely it is that client device 108(i) is moving, and/or how fast client device 108(i) is moving, based on the sequence of CSI measurements obtained at 202. At a given time, the motion indicator corresponds to a difference between consecutive CSI measurements at that time. In an example, AP 102 pair-wise correlates successive/adjacent CSI measurements, to produce successive motion indicators. E.g., $m_1 = CSI_1 * CSI_2$; $m_2 = CSI_2 * CSI_3$; and $m_3 = CSI_3 * CSI_4$; and, so on, where "*" is a correlation operator. Using pair-wise correlation (i.e., a correlation of only two CSI measurements) results in a motion indicator with a relatively higher value when client device 108(i) is stationary, and a relatively lower value (that is lower than the relatively higher correlation value) when the client device is moving. Either through experimentation or a learning process, a correlation value threshold (also referred to as a "threshold correlation value") may be set, such that correlation values above the threshold are deemed to indicate that the client device is not moving, while correlation values equal to or below the threshold are deemed to indicate that the client device is moving. Moreover, for correlation values equal to or below the threshold, the correlation value indicates an extent of motion, e.g., how fast the client device is moving. In this example, the motion indictor (i.e., a correlation value) is a scalar value. The correlation value threshold represent a proxy for client device motion, i.e., thresholding on the correlation values performs classification of the client device into moving and non-moving.

It is understood that other types of motion indicator may be used. For example, the motion indicator may be a higher dimensional motion indicator, such as a difference vector of CSI, without correlation, as will be described below in connection with a neural network embodiment.

At 206, AP 102 measures an SNR associated with the communication channel, to produce an SNR measurement ($snr_t$). In one example, AP 102 measures the SNR of packets received from client device 108(i). Alternatively, client device 108(i) measures the SNR of packets transmitted by AP 102 to the client device, and then the client device transmits the measured SNR (i.e., SNR measurements) to the AP. In another embodiment, a channel power measurement may replace SNR.

At 208, AP 102 records an indication of a device type (d) of client device 108(i). In one example, AP 102 may record a media access control (MAC) address of client device 108(i) as a proxy for the device type. In another example, AP 102 records a model number of client device 108(i) as the device type. The model number is a predetermined information stored in a database accessible to AP 102.

At 210, using a learning-based algorithm, AP 102 selects a PHY or link layer transmission parameter ($p_t$) among multiple candidate PHY or link layer transmission parameters ($p_1$-$p_N$) based on a set of observation parameters including the motion indicator, the measured SNR, and the device identifier for client device 108(i). The PHY and link layer transmission parameters are generally referred to as "MAC layer transmission parameters" because they configure aspects of a MAC layer implemented in AP 102. AP 102 may select the transmission parameter from among the following candidate transmission parameters, for example:

a. Lower dimensional modulation and coding (MCS) indexes, e.g., MCS only, including {MCS0-MCS9} for 9 choices/candidates.

b. Higher dimensional MCS indexes, e.g., joint selection of spatial stream and MCS, including {MCS0-SS1, MCS1-SS1-MCS9-SS1, and MCS0-SS2-MCS9-SS2} for 18 choices/candidates for a two spatial stream client device.

c. Either SU-MIMO or MU-MIMO mode of operation.

At 212, AP 102 configures its PHY and/or link layers based on the selected transmission parameter, and transmits packets to client device 108(i). That is, AP 102 employs the selected transmission parameter to transmit the packets to client device 108(i).

At 214, AP 102 measures a transmission performance ($T_t$) associated with the transmission parameter based on the transmitted packets. The transmission performance measures how well the transmission parameter works, i.e., how well suited the transmission parameter is to the current channel conditions and the device type. The transmission performance may be measured using any known or hereafter developed technique. For example, the transmission performance may be measured in terms of a (i) ratio of a number of successful bytes transmitted and a transmit time for transmitting the bytes, (ii) a bit/packet error rate, and (iii) air time usage efficiency as a function of number of concurrent client devices and effective throughput per client device, and so on. AP 102 may employ feedback from client device 108(i) to determine the transmission performance based on a number of bytes transmitted over a given time period by the AP, and a number of bytes received successfully at the client device and reported to the AP.

At 220, AP 102 updates the learning-based algorithm based on the set of observation parameters and the transmission performance for a next pass through select operation 210, transmit operation 212, and measure transmission performance operation 214. Operation 220 employs an update algorithm to update or train the learning-based algorithm. The process is repeated over time, which results in adaptation of the selection process and the transmission parameter that is selected by that process over time.

As described above, AP 102 selects the transmission parameter based on at least the motion indicator. In an example, AP 102 may compare correlation values to the correlation value threshold to determine whether client device 108(i) is moving or is not moving, and then use the outcome of that determination to select the transmission parameter. In a first example, if it is determined that client device 108(i) is not moving or is moving, AP 102 selects the MU-MIMO mode for transmission or does not select the MU-MIMO mode for transmission (i.e., drops the client device out of the MU-MIMO mode), respectively. In a second example, if it is determined that client device 108(i) is not moving or is moving, AP selects two spatial streams for transmission or selects one spatial stream for transmission, respectively. More generally, AP 102 selects a number of spatial streams for transmission. In a third example, AP 102 chooses to request CSI sounding from client device 108(i) more frequently when client device motion is high (e.g., the client device is moving relatively fast) relative to when client device motion is low (e.g., the client device is moving relatively slow). More generally, the transmission parameter corresponds to the interval between CSI sounding requests/packets. In a fourth example, AP 102 may choose to employ Space Time Block Coding (STBC) for a moving client device, but choose not to employ STBC for non-moving client devices, depending on a value of the motion indicator. In a fifth example, the transmission parameter corresponds to a mapping of downlink spatial streams to different clients in a MU-MIMO group. In the learning-based approach, the correlation value threshold may be adjusted dynamically at operation 220 based on the feedback of transmission performance. Different thresholds may be learned separately for different client devices. In a non-learning based approach, the correlation value threshold remains fixed, i.e., the learning feedback is not used to adapt the correlation value threshold.

Figure 3:
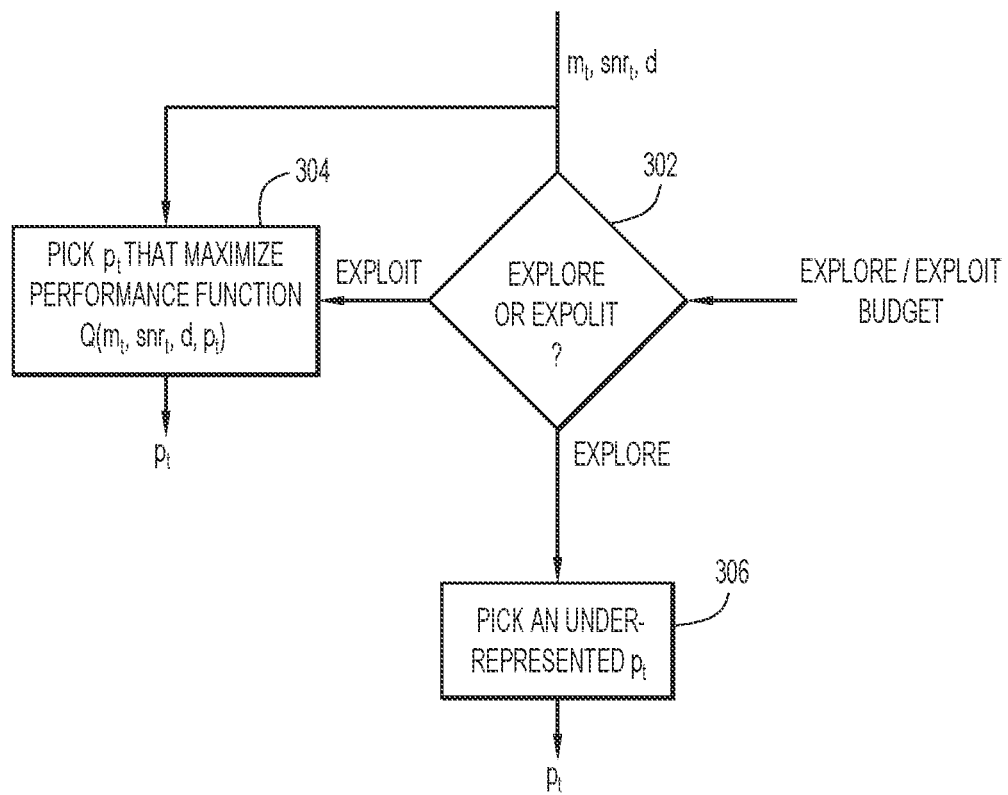
FIG. 3 shows operations expanding on an operation to select transmission parameters in the method of FIG. 2, according to an example embodiment.

With referenced to FIG. 3, there are shown example operations 302-306 expanding on select operation 210 of method 200, performed by the learning-based algorithm. The example of FIG. 3 assumes that the learning-based algorithm may use/has access to a performance function that depends on the mobility indicator, the SNR, the device type, and the (selected) transmission parameter (thus, the performance function may be denoted $Q(m_t, snr_t, d, p_t)$). As mentioned above, the learning-based algorithm is invoked repeatedly to select transmission parameters as the operations of method 200 are performed repeatedly.

At 302, the learning-based algorithm determines whether to use (i.e., exploit) the performance function to select the transmission parameter, or not to use the performance function to select the transmission parameters (and thus "explore" transmission parameters, instead). The explore/exploit decision can be based on setting aside a fixed budget, e.g., 5% of the time/number of passes through select operation 210 to explore, and 95% of the time/number of passes through select operation 210 to exploit. The decision may also be based on state, e.g., in a current state of ($m_t$, $snr_t$, d), the learning-based algorithm has selected many past examples of all different choices of transmission parameter, and will opt to exploit this past knowledge, rather than explore transmission parameters that have not been tried many times. The learning-based algorithm maintains a history of a number of times it has been invoked to select a transmission parameter, the selected transmission parameters, a number of times the exploit path has been taken, and a number of times the explore path has been taken. The learning-based algorithm uses the history and the budget to determine whether to explore or exploit.

If it is determined to use/exploit the performance function, flow proceeds to 304. At 304, the learning-based algorithm selects the transmission parameter that maximizes the performance function.

If it determined not to use/exploit the performance function, flow proceeds to 306. At 306, in one example, the learning-based algorithm randomly selects the transmission parameter from the candidate transmission parameters. In another example, the learning-based algorithm selects an under-represented transmission parameter, i.e., a transmission parameter that has not been selected recently based on the history of selected transmission parameters (e.g., select a transmission parameter that has not been selected in the last N selected parameters, as indicated in the history of selected parameters, where N is a predetermined, integer greater than 1, such as 20, for example).

In summary, operation 302 determines whether to select the transmission parameter without using (i.e., explore) the learning-based algorithm or using (exploit) the learning-based algorithm. If it is determined to select the transmission parameter without using the learning-based based algorithm, operation 306 (explore) selects the transmission parameter without using the learning-based algorithm and without using the observation parameters (e.g., by randomly selecting a transmission parameter, or by selecting an under-represented transmission parameter based on the history of past transmission parameters). If it determined to select the transmission parameter using the learning-based algorithm, operation 304 (exploit) selects the transmission parameter using the learning-based algorithm. The determine operation basis its decision on a budget input that ensures that the exploit path is chosen more often than not, e.g., 95% of the time.

Figure 4:
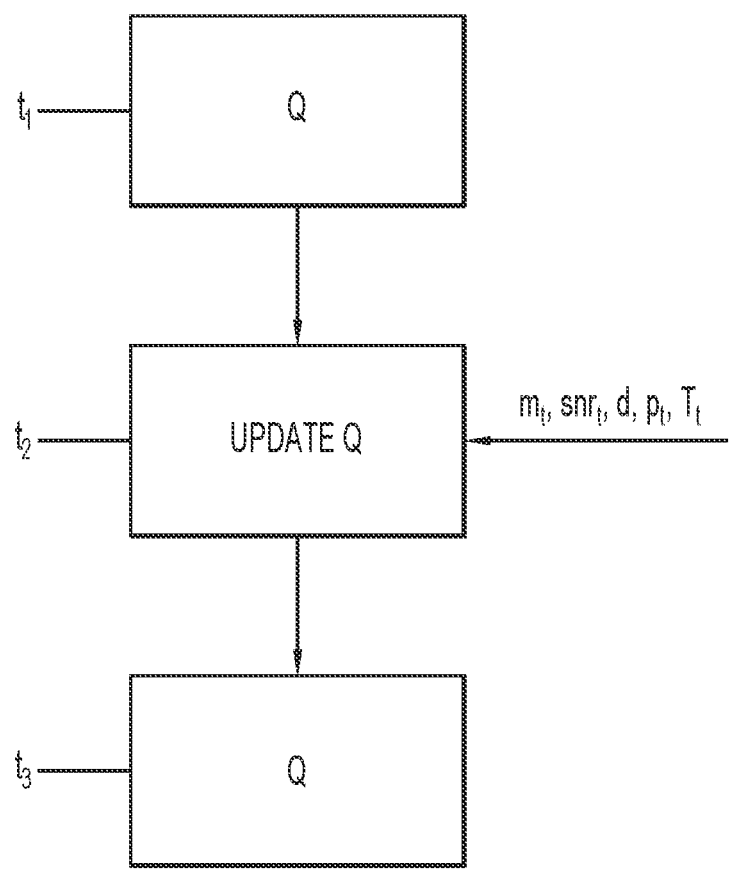
FIG. 4 shows operations performed by an update algorithm of the learning-based algorithm, according to an example embodiment.

With reference to FIG. 4, there is an illustration of example operations performed by an update algorithm of the learning-based algorithm (e.g., in update operation 220). The example of FIG. 4 assumes the learning-based algorithm includes the performance function (Q) described above in connection with FIG. 3, and that the update algorithm updates the performance function. Times $t_1$, $t_2$, and $t_3$ represent first, second, and third consecutive passes through the learning-based algorithm and, correspondingly, the update algorithm. At time $t_2$, the update algorithm updates the performance function based on the mobility indicator, the measured SNR, the device type, the selected transmission parameter, and the transmission performance that were used in or resulted from the second pass through the learning-based algorithm. The specific operations performed by the update algorithm depend on how the performance function is implemented. If the performance function is implemented in the context of a neural network, the update algorithm may be based on a gradient update algorithm. If the performance function is implemented as a look-up table, the update algorithm may perform weighted averaging on an appropriate entry in the table, as described below.

Table-Based Performance Function

Figure 5:
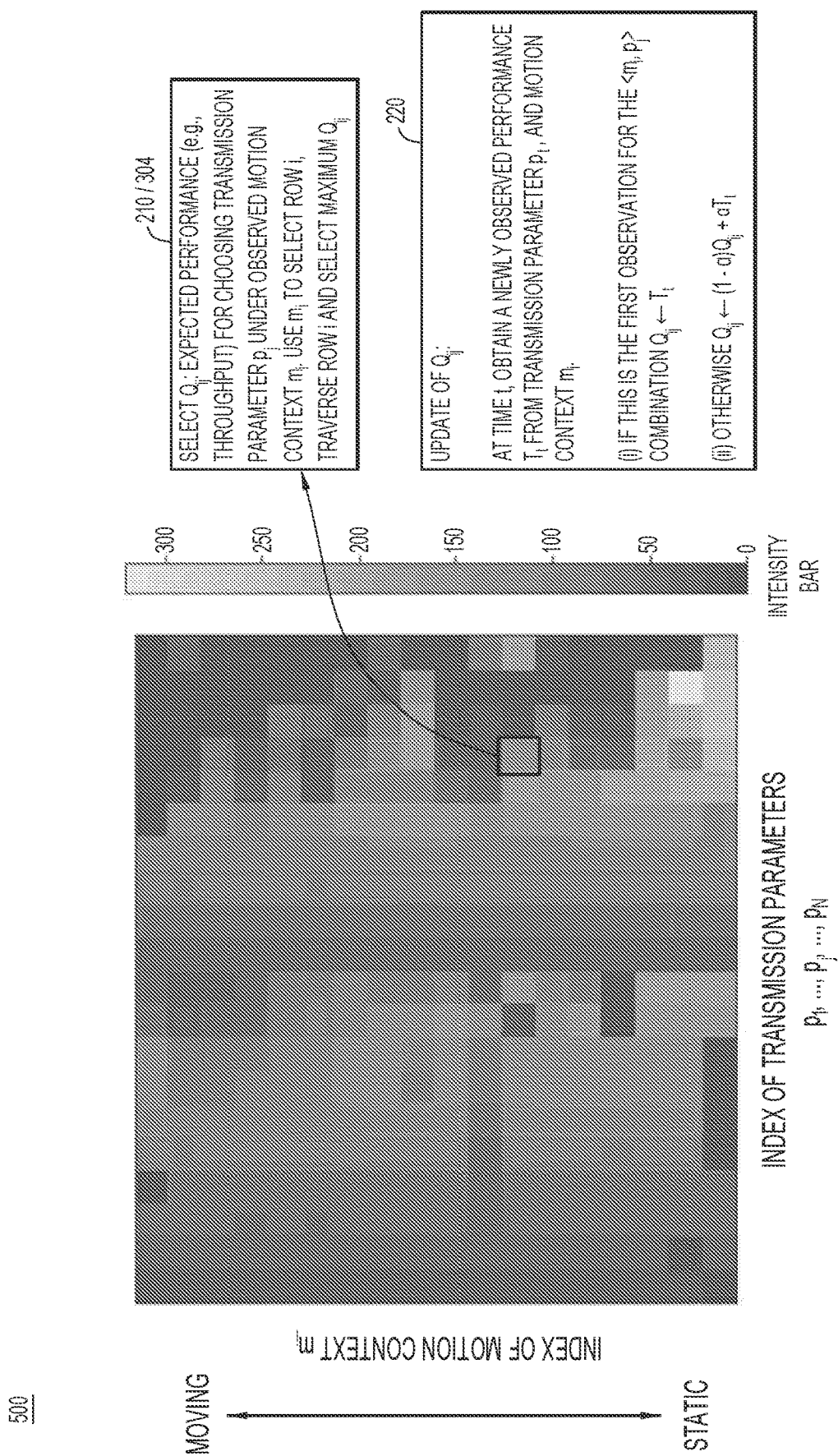
FIG. 5 is an illustration of a table-based performance function populated with expected values of the performance function, according to an example embodiment.

With reference to FIG. 5, there is an illustration of an example performance function 500 (Q) implemented as a table populated with expected values $Q_{ij}$ of the performance function. The table-based approach may be used when the observed condition for each device type (e.g., mobility indicator, SNR) can be discretized to a limited number of combinations. The expected values $Q_{ij}$ of the performance function may represent expected values of transmission performance, e.g., as measured at operation 214. The table of FIG. 5 includes rows indexed to motion content, i.e., to values of a mobility indicator $m_i$. That is, each mobility indicator value in a range of mobility indicators values maps to a corresponding row index (i) in a range of row indexes. The table also includes columns indexed to candidate transmission parameters $p_1$-$p_N$. That is, each transmission parameter $p_j$ maps to a corresponding column index (j). The table is populated with expected values $Q_{ij}$ of the performance function. Thus, the tuple<mobility indicator$_i$, transmission parameter$_j$> indexes the expected value $Q_{ij}$. In the example of FIG. 5, each expected value $Q_{ij}$ may fall anywhere in a range from 0 to 300 as measured in effective throughput in Megabits-per-second (Mbps), and is represented in grey scale. The grey scale is mapped to a range according to a vertical grey scale intensity bar depicted next to the table.

FIG. 5 also shows an example of select operations 210/304 described above in connection with FIGS. 2 and 3 in the context of table-based performance function 500. As shown in the example of FIG. 5, the learning-based algorithm uses the table to select a transmission parameter based on mobility indicator $m_i$ made available to the learning-based algorithm. Specifically, the learning-based algorithm uses mobility indicator $m_i$ to index a corresponding row of the table. The learning-based algorithm searches the row for the maximum expected value $Q_{ij}$ of the performance function. Once the maximum expected value $Q_{ij}$ is found, the learning-based algorithm identifies the column index j corresponding to the maximum expected value $Q_{ij}$, and thus identifies the corresponding transmission parameter $p_j$. The transmission parameter $p_j$ maximizes the performance function for the given mobility indicator value $m_i$.

FIG. 5 also shows an example of update operation 220 described above in connection with FIGS. 2 and 4 in the context of table-based performance function 500. Update operation 220 may update expected value $Q_{ij}$ in table 500 in the following manner. At time t (e.g., $t_2$ in FIG. 4), update operation 220 obtains (i) currently observed transmission performance $T_t$ resulting from transmission of packets using selected transmission parameter $p_j$, and (ii) motion indicator $m_i$. The update takes the following form:

a. If this is the first observation for the <$m_i$, $p_j$> tuple, then
      $Q_{ij} \leftarrow T_t$.

b. If this is not the first observation for the <$m_i$, $p_j$> tuple, then $Q_{ij} \leftarrow (1-\alpha)Q_{ij} + \alpha T_t$, where $\alpha$ is a fraction less than 1. This is a weighted update of the expected value $Q_{ij}$.

The table depicted in FIG. 5 represents the performance function for a single client device, e.g., client device 108(i). In practice, the learning-based algorithm maintains multiple such table-based performance functions each corresponding to a respective one of the multiple client devices. The device type (d) unique to each client device provides an index to the corresponding table-based performance function for that client device, such that selecting the transmission parameter for the client device and updating the performance function for the client device occurs in the context of the corresponding table-based performance function. Alternatively, a simpler index for each device that does not take into account device type may be used. Thus, the table-based performance function may be represented as a 3-dimensional table, where one of the dimensions is indexed by device type. Alternatively, the table-based performance function may also be represented as a collection of tables where each table corresponds to a different device type. This may be used in a scenario where the observed motion indicator values are quantized differently for different devices.

Neural Network-Based Performance Function and Learning

Figure 6:
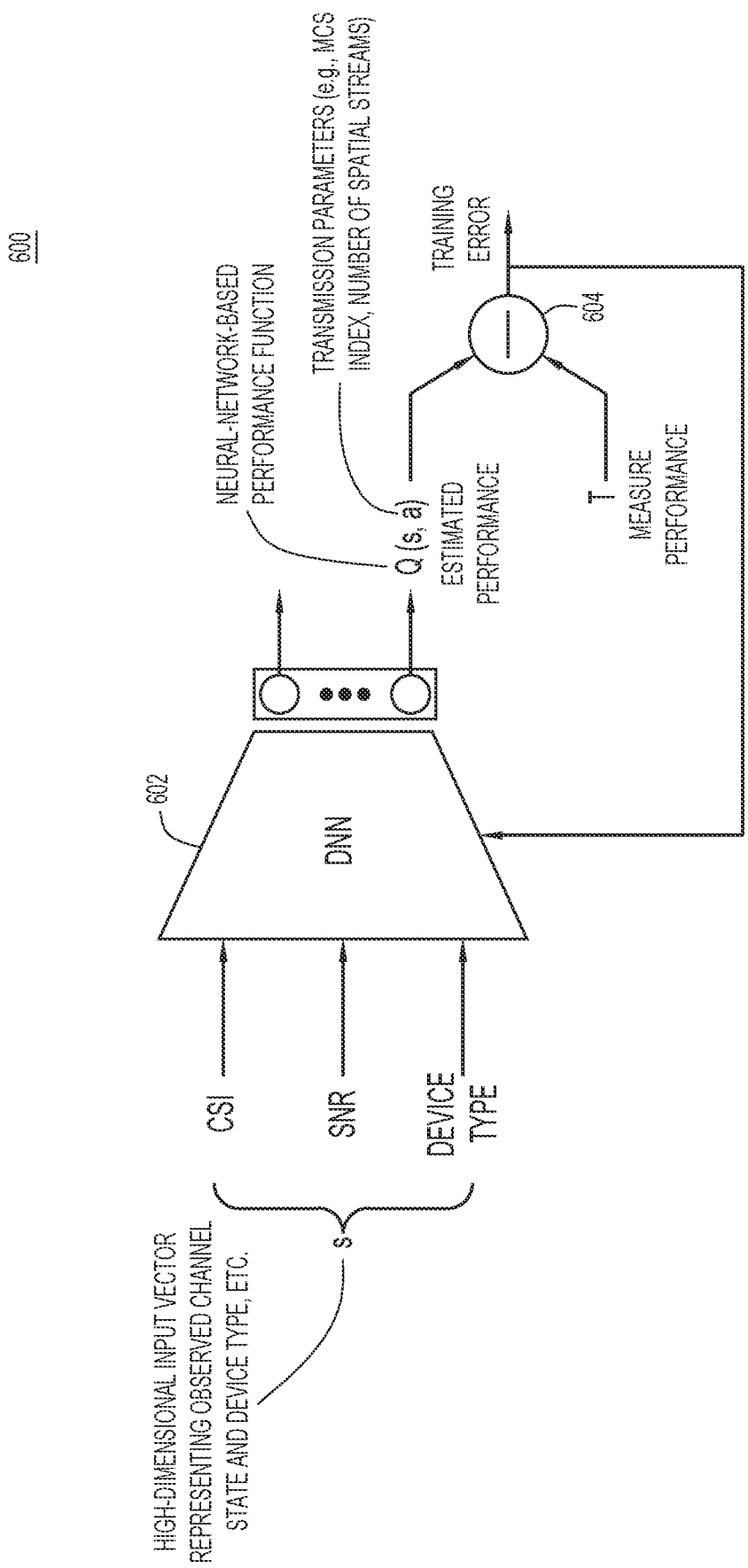
FIG. 6 is an illustration of a neural network-based performance function, according to an example embodiment.

With reference to FIG. 6, there is an illustration of an example performance function 600 (Q) implemented using a neural network. Neural network-based performance function 600 includes a deep neural network (DNN) 602 to represent the performance function. DNN 602 receives a high-dimensional input vector s representing observed CSI, SNR, and device type, and generates a set of expected values Q(s, a) of the performance function (i.e., estimated transmission performance) based on the input vector s, where a represents a candidate transmission parameter associated with a given one of the expected values. The learning-based algorithm determines a maximum one of the expected values Q(s, a) and uses its associated transmission parameter a as the selected transmission parameter.

Parameters of DNN 602 representing the performance function 600 may be trained from previously observed tuples of $<s_t, a_t, T_t>$, using various known or hereafter developed training algorithms. For example, a subtractor 604 receives an expected value Q(s, a) and a corresponding transmission performance T resulting from use of the transmission parameter a. Subtractor 604 determines a difference between the expected value Q(s, a) and the transmission performance T, to produce a training error. Subtractor 604 provides the training error as feedback to DNN 602, which learns from the feedback. Alternatively, a DNN may be used to represent a policy that probabilistically maps the input state vector s to the best transmission parameter a. The parameter of such a DNN-based policy can also be learned from previous experiences using a policy gradient method.

Predictive Grouping for MU-MIMO

Embodiments directed to client device prescreening for MU-MIMO or SU-MIMO operation are now described. MU-MIMO is a technique in IEEE 802.11ac and forthcoming IEEE 802.11ax standards to improve spectral efficiency by allowing concurrent transmission between an AP and multiple wireless client devices (also referred to as "clients"). The standards embrace MU-MIMO as an option for transmissions for both downlink and uplink transmissions. User group selection is the process of choosing client devices for concurrent MU-MIMO transmission in an AP. One common implementation of conventional client device group selection, referred to as "reactive grouping," relies on trial and error, without prior knowledge of whether conditions relative to client device are favorable to MU-MIMO. Essentially, client device groups (also referred to as "client groups") are formed at random and client devices (i.e., users) found to perform poorly in previous MU-MIMO transmissions are removed from the groups. The conventional client device group selection assumes that CSI is reliable (i.e., of sufficient coherence time). In contrast, embodiments presented herein address a complementary aspect of screening when a client device can gainfully participate in MU-MIMO without assuming CSI is reliable. The embodiments explicitly consider the difference in consecutive CSI, which gives a measure of CSI reliability that helps to accurately determine whether transmission in MU-MIMO is advisable. The embodiments adapt to differences in device types of clients and environment, and use machine learning to continuously learn from past AP experience to determine whether a client can gainfully participate in MU-MIMO. The embodiments use a predictive approach referred to as "predictive grouping" to determine whether the MU-MIMO mode is advisable. Thus, the embodiments use CSI, device type, and a machine learning-based approach for predicting the SU vs. MU mode of a client device given its sounding CSI. The reinforcement learning formulation of the policy optimization problem lends itself to both offline learning and online learning.

By way of background, MU-MIMO transmission in 802.11ac starts with a channel sounding procedure. The AP initiates the channel sounding procedure by transmitting a null data packet (NDP) announcement frame to gain channel access. This is followed by an NDP frame as in single-user beamforming, so that a first user in the group can respond with a compressed beamforming action frame containing the measured channel state information (CSI) in compressed form. The AP then polls additional users in the group sequentially, each using a new beamforming report poll frame, to collect their respective compressed beamforming reports of CSI. If the channel state (as indicated by CSI) is known precisely, whether SU-MIMO or MU-MIMO is more efficient can be deduced directly for a given client device or client group. In practice, however, given only infrequent feedback on compressed CSI information per client device, such determination can be challenging because of the impact of various physical factors on the spectral efficiency of MU-MIMO transmission. The factors include client device mobility, channel SNR, and client device type, and their impacts are discussed below.

With respect to client device mobility, assuming sounding intervals (e.g., times between sounding packets) of approximately 0.1 seconds, a client device moving at walking speed can lead to a non-trivial CSI difference within a sounding period, such that the CSI used for the MU-MIMO beamforming is inaccurate in part of the period. This leads to higher packet error rate (PER) and throughput degradation when the MU-MIMO group includes moving client devices—unreliable CSI limits the MU-MIMO performance. It has been observed that both SU and MU performance degrade in the presence of moving client devices, but that the throughput of MU-MIMO may drop even more drastically than that of SU-MIMO. This may lead to a situation in which the MU mode throughput of a moving client device under-performs the SU mode. Therefore, to realize performance gain of the MU-MIMO, it may be necessary to exclude moving client devices from a MU-MIMO group. Thus, indications of client device mobility are useful to the client device prescreening algorithm.

While unreliable CSI limits the MU-MIMO performance, another factor that limits the performance is the decrease in signal strength due to MU-MIMO beamforming. The SNR from MU-MIMO beamforming can be significantly lower (e.g., 5 dB) than from SU-MIMO beamforming. MU-MIMO throughput of a client device may drop below that of SU-MIMO when the SNR at the client device is low. In the MU-MIMO group with client devices with low SNR, the MU performance of the client devices with high SNR also drops. It follows that enabling the MU-MIMO for client devices with low SNR leads to inefficient MU-MIMO grouping.

As discussed above, client device motion and low SNR are two major factors that limit performance in the MU-MIMO mode. Thus, excluding moving client devices and client devices with low SNR from participating in MU-MIMO can be beneficial; however, as different types of client devices have different characteristics, the performance degradation due to motion and low SNR may vary from client device to client device. Using the same criterion to screen client devices for MU-MIMO grouping may not work well. For instance, different device types support different numbers of spatial streams, resulting in different performance gains from choosing MU-MIMO over SU-MIMO. Different firmware and antenna positioning designs may also lead to different levels of sensitivity to motion and low SNR. Given the variance of performance gain across different device types, it is helpful for the client grouping scheme to explicitly account for the different device types, in addition to the mobility and the SNR.

Considering MU-MIMO downstream transmissions, at any time, an AP can choose from a set of MU-MIMO capable client devices, called candidates, a subset to form a client group. According to embodiments presented herein, the AP employs a predictive approach which prescreens client devices before including them as MU-MIMO candidates. The AP uses a reinforcement learning formulation of the client device prescreening problem, in which the AP decides whether to include a client device in the MU-MIMO group based on its device type and recent channel sounding feedback (CSI and SNR). Thus, the AP predicts whether a given client device is suitable for MU-MIMO transmission, such that the AP prescreens all client devices in the candidate set, and only includes the ones favorable for MU mode for grouping.

The determination of whether a given client device should operate in SU or MU mode naturally fits a binary classification task; however, such a binary classifier should be trained separately for different client device types. It is further expected that the classifier should adapt to different environments encountered by the same client device. As such, rather than deploying a static pre-trained classifier, the task of client device prescreening calls for continuous learning, which may include online learning. Note further that, at any given time, a client device is either operating in SU or MU mode, but not both. Therefore, the outcome of both modes cannot be measured for any given observed state. In other words, the true label of whether SU or MU is the best option is not generally available. This makes the problem ill-fitted for a classification-based formulation.

Instead, the client device prescreening problem is formulated as one of reinforcement learning. At a high level, given an observed state s, the system (AP) chooses whether to invoke MU-MIMO for a given client device as a binary action a following the probabilistic policy function $\pi_\theta(a|s)$, leading to an observed reward r=r(s, a). The collection of previously observed state-action-reward triplets are used to update the policy function π for future decisions.

The following treatment spells out the details of how (i) states, (ii) actions, (iii) rewards, and (iv) reinforcement learning via a policy gradient method are defined for client device prescreening for MU-MIMO or SU-MIMO operation.

States: The system state includes both the compressed CSI and per-subcarrier SNR from periodic channel sounding feedback. In 802.11ac, a single snapshot of CSI derived from the compressed beamforming feedback report is usually insufficient for the purpose of inferring client device motion. Therefore, a state variable is composed as multiple recent observations of CSI values to capture temporal dynamics of the wireless channel. Motivated by the observation that MU-MIMO performance is device-dependent, the state is further expanded to include the device type $d_c$ of each client device. Indexing each sounding period by k and denoting the window size of recent observations as w, the system state at time instant k can be expressed as:

$$s_k = [CSI_{k-w:k}, SNR_k, d_c] \quad (1)$$

It is sufficient to keep two consecutive CSI reports as system state; therefore, in the present example, w=1.

Actions: The action space includes two options: A={0, 1}. Here, a=1 corresponds to including the client device for MU-MIMO transmission, and a=0 denotes serving it in SU-MIMO mode.

Rewards: The instantaneous reward directly reflects the spectral efficiency of transmitting to the client device in either SU (a=0) or MU (a=1) mode:

$$r(s,a=0)=(1-PER)R \quad (2)$$

$$r(s,a=1)=(1-PER)RN_g \quad (3)$$

Here, the effective throughput of each client device is a function of the measured packet error rate PER and PHY rate R corresponding to the MCS index of that transmission. As such, a client device that supports multiple spatial streams in SU transmission is properly credited. The reward for the MU mode is further scaled by the number of concurrent users in the group $N_g$ to account for the reduction on airtime utilization due to concurrent transmissions. Thus, the variable Ng captures the air time usage efficiency mentioned above.

In the present example, the state transition dynamics, represented as $\Pr\{s_{t+1}=s'|s_t=s\}$, are independent of the action $a_t$. This simplifies the formulation in that instead of attempting to maximize total reward with a finite horizon or a discount factor over infinite horizon, the focus remains on maximizing the instantaneous reward at each step.

Reinforcement Learning via Policy Gradient Method: There are a number of different algorithms for online reinforcement learning that are possible, including Deep Q Learning and the policy gradient approach. The present example follows the policy gradient approach. The policy function is modeled as a deep neural network $\pi_\theta(a|s)$ with parameter θ, taking s as input and assigning a probability for each possible action a ∈ A as output. The action a given the current state s is sampled according to $\pi_\theta(a|s)$, so that the best action is predominantly chosen if certain, but explores more frequently if the two actions have similar probabilities. The performance function for the policy parameterized by θ directly corresponds to the expected return of the given policy:

$$J(\theta) = E_{(s,a,r) \sim \pi_\theta}(a|s)^{r(s,a)}$$

$$= \sum_{a' \in A} \pi_\theta(a'|s)r(s, a')$$

This can be estimated as $$J(\theta) \approx \frac{1}{K}\Sigma_k r_k$$

during online learning, given a set of operation trajectory from past experiences $\{(s_1, a_1, r_1), \ldots, (s_k, a_k, r_k), \ldots, (s_K, a_K, r_K)\}$. The parameter θ for the policy function is updated as:

$$\theta \leftarrow \theta + \alpha \nabla_\theta J(\theta),$$

where α denotes the learning rate and the policy gradient term $\nabla_\theta J(\theta)$ is calculated as:

$$\nabla_\theta E_s r = \frac{1}{K} \sum_{k=1}^{K} r_k \nabla_\theta \log \pi_\theta(a_k|s_k)$$

In the present example, the temporal difference between two consecutive CSI reports is used as input, along with the vector on per-subcarrier SNR values $SNR_k$ and client device type $d_c$. The neural network representing the policy function $\pi_{74}(a|s)$ is comprised of two convolutional layers, each followed by 2×2 max-pooling, and five fully connected layers. The two convolutional layers both have a filter size of 2×5 with 16 filters for the first layer and 32 for the second layer. The numbers of units in the fully connected layers are 30, 20, 10, 5, and 2, respectively. A soft maximum output from the top 2-unit layer corresponds to the probability of choosing either SU or MU as the transmission. Only the CSI information is fed to the convolutional layers, whereas $SNR_k$ and $d_c$ are fed to the fully connected layers directly.

Figure 7:
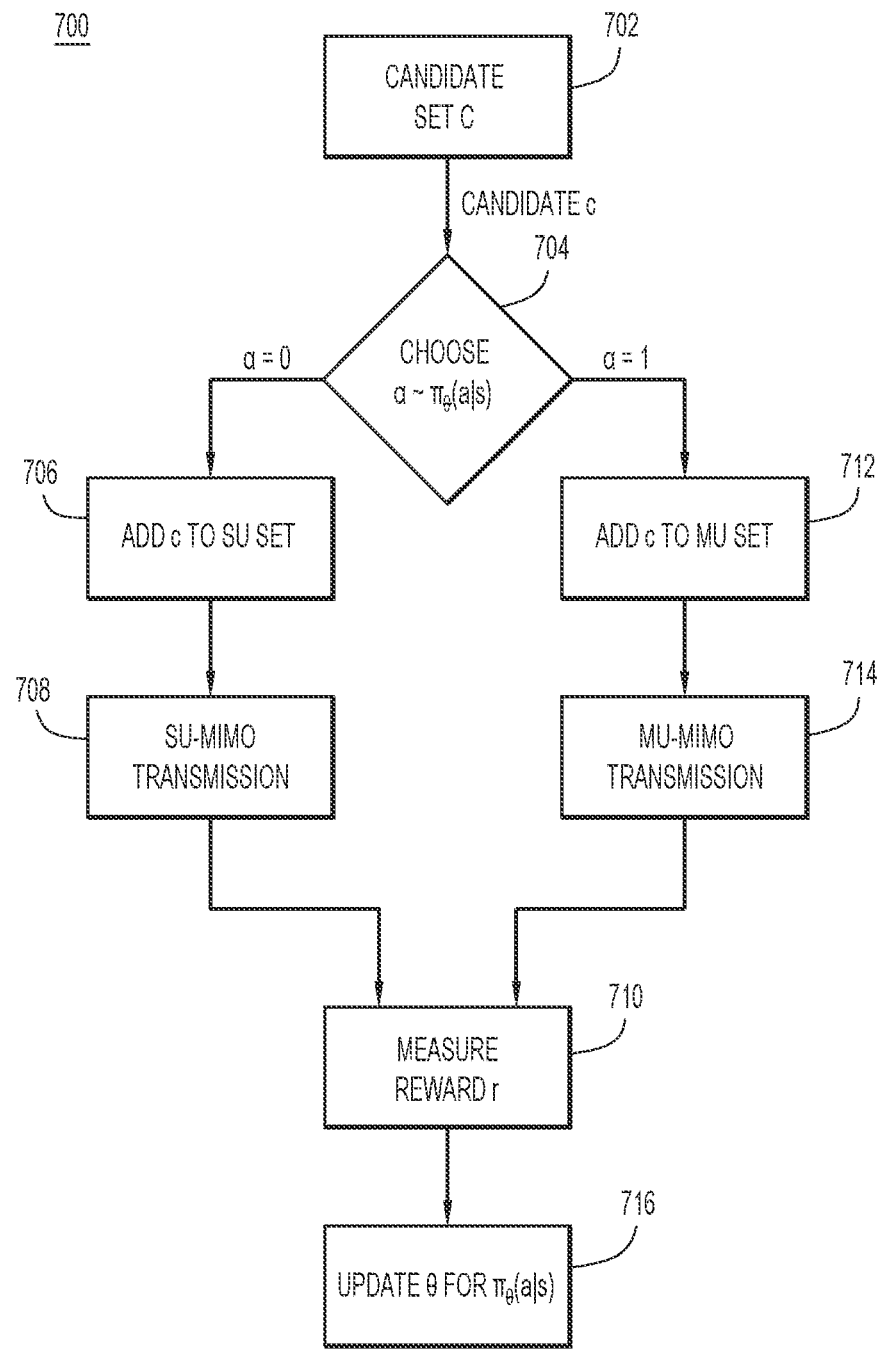
FIG. 7 is a flowchart of a predictive scheme based on reinforcement learning for client prescreening for MU-MIMO or SU-MIMO operation, according to an example embodiment.

With reference to FIG. 7, there are shown operations for an example predictive scheme 700 based on reinforcement learning for client device prescreening for MU-MIMO or SU-MIMO operation, performed by an AP, e.g., AP 102. Predictive scheme 700 assumes the above-defined of states, actions, rewards, and reinforcement learning via a policy gradient method.

At 702, AP 102 identifies a candidate set C of client devices to be evaluated for MU-MIMO, and prescreens each client device c in set C in subsequent operations 704-716, described below.

At 704, AP 102 evaluates policy function $\pi_{74}(a|s)$ to either an action a=0 (add the client device c to an SU set) or to an action a=1 (add the client device c to an MU set).

At 706, if action a=0, AP 102 adds client device c to the SU set, and flow proceeds to 708. At 708, AP 102 performs SU-MIMO transmission to client device c, and flow proceeds to 710.

At 712, if action a=1, AP 102 adds client device c to the MU set, and flow proceeds to 714. At 714, AP 102 performs MU-MIMO transmission to client device c, and flow proceeds to 710.

At 710, AP 102 measures reward r, i.e., transmission performance, associated with applying action a, and flow proceeds to 716.

At 716, AP 102 updates policy function $\pi_{74}(a|s)$ based on the measured reward, and the process repeats with the updated policy function.

AP Architecture

Figure 8:
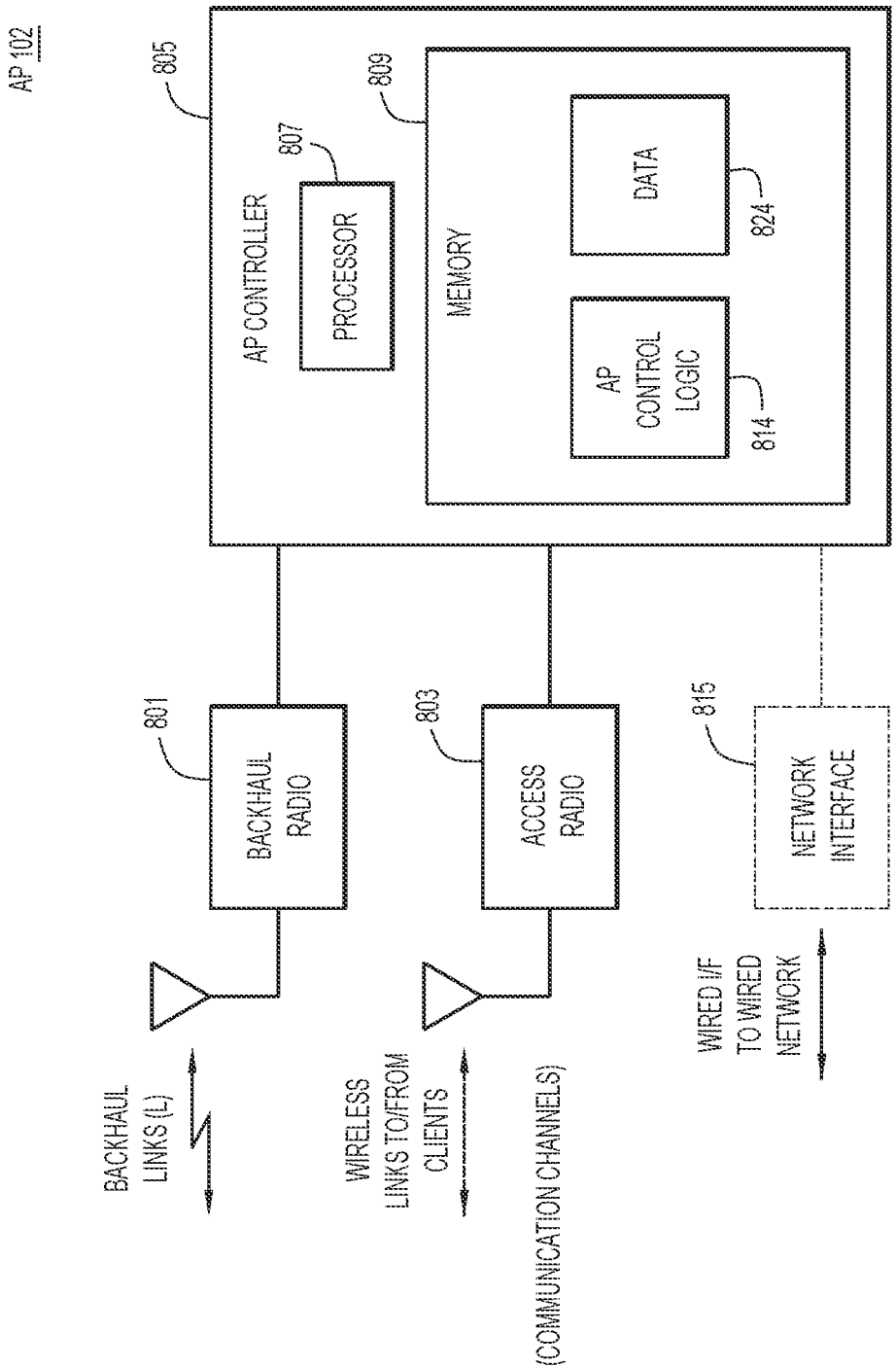
FIG. 8 is a block diagram of the AP configured to perform operations according to embodiments presented herein, according to an example embodiment.

With reference to FIG. 8, there is shown a block diagram of AP 102 configured to perform operations according to techniques provided herein. AP 102 includes a wireless backhaul radio 801 (also referred to a transmitter/receiver or "transceiver" 801) to support wireless backhaul links leading to network 106, a wireless access radio 803 to support access for wireless client devices served by the AP, and an AP controller 805 to which the backhaul and access radios are coupled. In an embodiment, radios 801 and 803 are integrated into a single radio. Backhaul radio 801 may operate according to IEEE 802.11a in the approximately 5 Gigahertz band, and access radio 803 may operative according to IEEE 802.11b/g in the approximately 8.4 GHz band, for example. Each radio includes a respective set of one or more antennas. AP 102 may include a wired network interface 815 that enables the AP to connect to network 106.

AP controller 805 includes a processor 807 and memory 809. Processor 807 is a microcontroller or microprocessor, for example, configured to execute software instructions stored in memory 809. Memory 809 may comprise read only memory (ROM), random access memory (RAM), magnetic disk storage media devices, optical storage media devices, flash memory devices, electrical, optical, or other physical/tangible (e.g., non-transitory) memory storage devices.

Thus, in general, memory 809 may comprise one or more computer readable storage media (e.g., a memory device) encoded with software comprising computer executable instructions and when the software is executed (by processor 807) it is operable to perform the operations described herein. For example, memory 809 stores or is encoded with instructions for control logic 814 to perform overall control of AP 102 and to select and update PHY and link layer transmission parameters at AP 102 using a learning-based algorithm, including operations described in connection with FIGS. 2-7. The PHY and link layer transmission parameters referred to above configure PHY and link layers implemented in access radio 803 and controller 805 of AP 102.

Memory 809 also stores information/data 824 used and generated by logic 814.

Reactive Grouping vs. Predictive Grouping Performance Comparison

Figure 9:
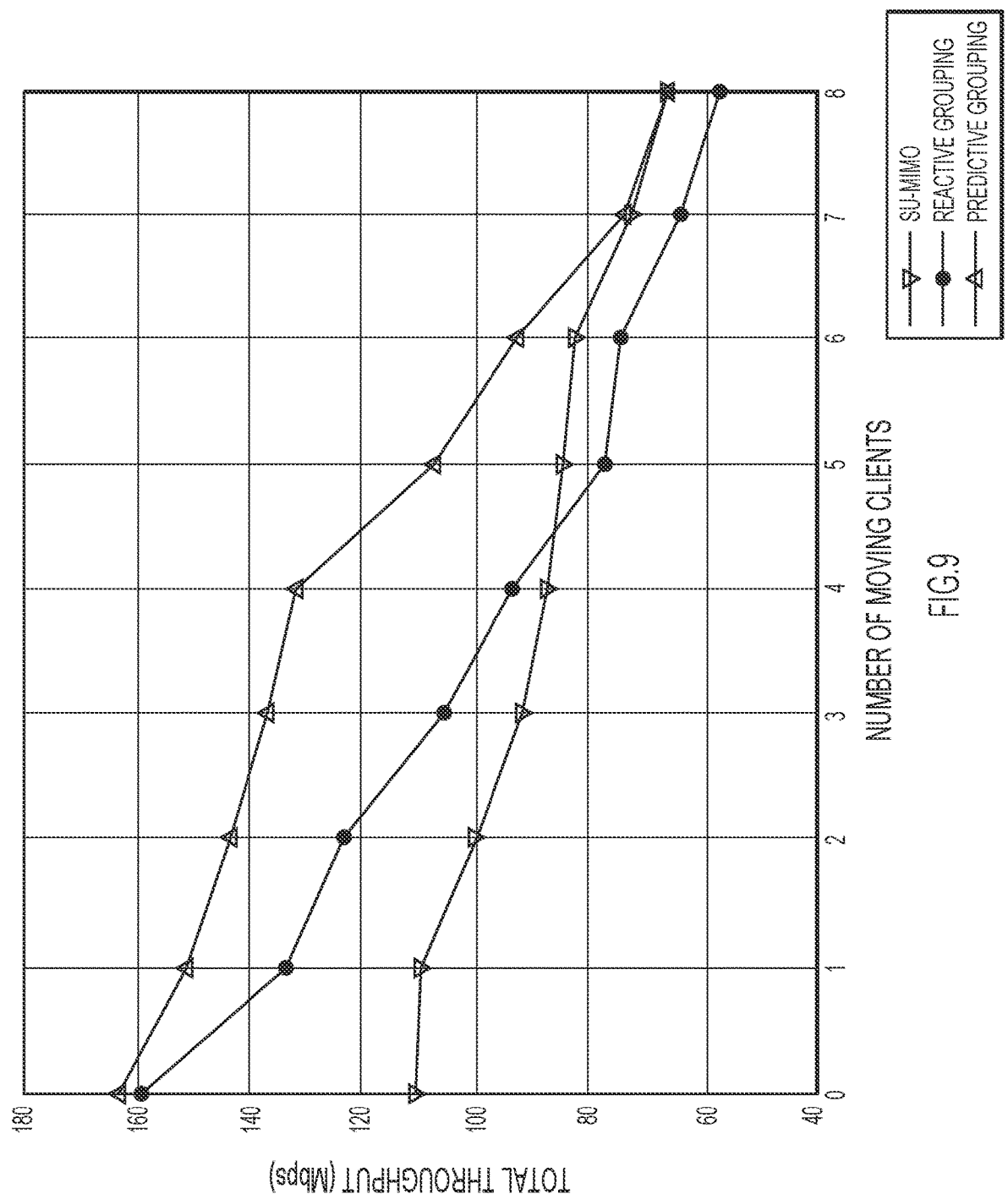
FIG. 9 is a graph that compares total throughput for an 8-client network achieved by predictive and reactive grouping under client mobility.

With reference to FIG. 9, there is a graph that compares total throughput for an 8-client device network achieved by predictive and reactive grouping under client device mobility. As the results indicate, predictive grouping significantly outperforms reactive grouping and the exclusive use of SU-MIMO. When no client device is moving, all client devices are suitable for MU-MIMO most of the time. As more client devices move, the probability of forming MU-MIMO groups with moving client devices increases under reactive grouping, and the improvement from the predictive grouping becomes more significant.

Summary

Embodiments presented herein select MAC layer transmission parameters using a motion measure determined from a sequence of CSI readings. The motion indicator can be computed via correlation of consecutive CSI measurements, or be incorporated in a learning-based method to additionally take into account differences in client device behavior. Because different client devices have different susceptibility to motion, the selection process is based on a policy gradient implementation of reinforcement learning, where a network is trained to predict which transmission parameter to select, e.g., whether a client device should perform MU-MIMO or SU-MIMO, based on the following inputs: consecutive CSI readings from sounding; a MAC address (as proxy for device type); and measured SNR for each spatial stream associated with the client device. The actual achieved throughput from the chosen transmission parameter is recorded for refinement of the selection process. The motion-measure can be implemented as a stand-alone block, or as an integral part of the overall learning-based parameter optimization model. Furthermore, in an integrated implementation, the CSI may contain pertinent information about the environment (in addition to knowledge of client device/device type), and the process may be extended to consider other contextual attributes as well.

In other embodiments, either a policy gradient method or a Deep Q learning method may be employed for learning how an AP assigns different client devices to different spatial streams based on CSI sounding results. The above-described motion indicator may also be used for guiding a selection of CSI sounding intervals in a learning based approach, where a performance function accounts for both CSI sounding overhead as well as a measured effective throughput resulting from different frequencies of CSI sounding.

Figure 10:
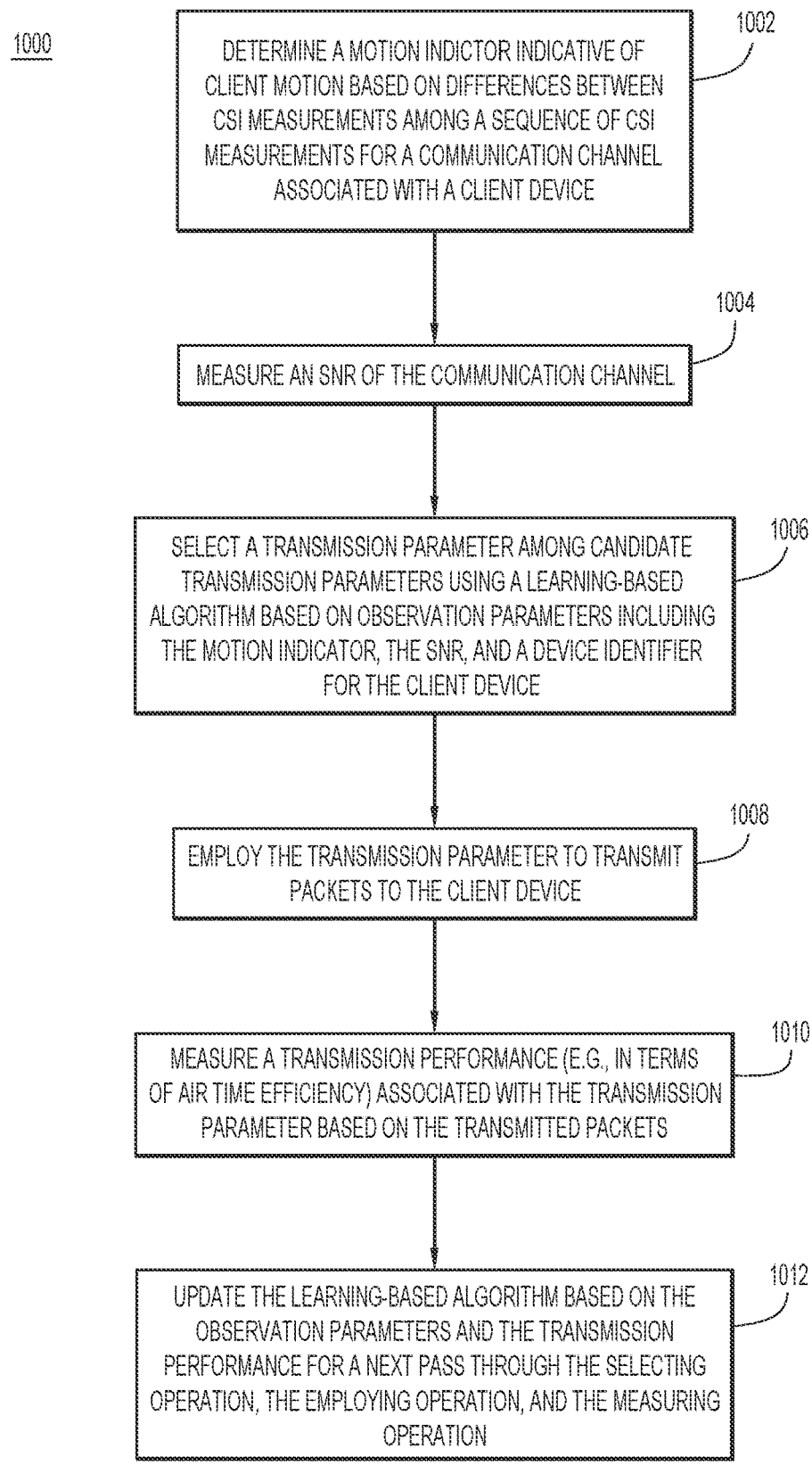
FIG. 10 is a flowchart of a high-level method performed by the AP, according to an embodiment.

With reference to FIG. 10, there is a flowchart of a summary method 1000 including operations described above performed by an AP (e.g., AP 102). The AP is configured to transmit packets to one or more client devices over one or more respective communication channels used by the one or more client devices. For each client device and the respective communication channel, the AP performs the following operations.

At 1002, the AP determines a motion indictor indicative of motion of the client device based on a sequence of channel state information measurements for the communication channel.

At 1004, the AP measures an SNR of the communication channel.

At 1006, the AP selects a transmission parameter among candidate transmission parameters using a learning-based algorithm based on observation parameters including the motion indicator, the SNR, and a device identifier for the client device.

At 1008, the AP employs the transmission parameter to transmit packets to the client device.

At 1010, the AP measures a transmission performance associated with the transmission parameter based on the transmitted packets. The transmission performance may be measured in terms of air time usage efficiency.

At 1012, the AP updates the learning-based algorithm based on the observation parameters and the transmission performance for a next pass through the selecting operation 1006, the employing operation 1008, and the measuring operation 1010.

In summary, in one form, a method is provided comprising: at an access point configured to transmit packets to a client device over a communication channel used by the client device: determining a motion indictor indicative of motion of the client device based on a sequence of channel state information measurements; measuring a signal-to-noise ratio (SNR) of the communication channel; selecting a transmission parameter among candidate transmission parameters using a learning-based algorithm based on observation parameters including the motion indicator, the SNR, and a device identifier for the client device; employing the transmission parameter to transmit packets to the client device; measuring a transmission performance associated with the transmission parameter based on the transmit packets; and updating the learning-based algorithm based on the observation parameters and the transmission performance for a next pass through the selecting, the employing, and the measuring.

In another form, an apparatus is provided comprising: a radio to transmit packets to a client device over a communication channel used by the client device; and a processor coupled to the radio and configured to: determine a motion indictor indicative of motion of the client device based on a sequence of channel state information measurements; measure a signal-to-noise ratio (SNR) of the communication channel; select a transmission parameter among candidate transmission parameters using a learning-based algorithm based on observation parameters including the motion indicator, the SNR, and a device identifier for the client device; employ the transmission parameter to transmit packets to the client device; measure a transmission performance associated with the transmission parameter based on the transmit packets; and update the learning-based algorithm based on the observation parameters and the transmission performance for a next pass through the select, the employ, and the measure operations.

In yet another form, there is provided a non-transitory computer readable medium encoded with instructions that, when executed by a processor of an access point configured to transmit packets to a client device over a communication channel used by the client device, cause the processor to perform: determining a motion indictor indicative of motion of the client device based on a sequence of channel state information measurements; measuring a signal-to-noise ratio (SNR) of the communication channel; selecting a transmission parameter among candidate transmission parameters using a learning-based algorithm based on observation parameters including the motion indicator, the SNR, and a device identifier for the client device; employing the transmission parameter to transmit packets to the client device; measuring a transmission performance associated with the transmission parameter based on the transmit packets; and updating the learning-based algorithm based on the observation parameters and the transmission performance for a next pass through the selecting, the employing, and the measuring.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at an access point configured to transmit packets to a client device over a communication channel used by the client device:
    determining a motion indictor indicative of motion of the client device based on a sequence of channel state information measurements;
    measuring a signal-to-noise ratio (SNR) of the communication channel;
    selecting a transmission parameter among candidate transmission parameters to maximize a performance function of a learning-based algorithm that generates expected values of transmission performance based on observation parameters including the motion indicator, the SNR, and a device identifier for the client device;
    employing the transmission parameter to transmit packets to the client device;
    measuring a transmission performance associated with the transmission parameter based on the transmit packets; and
    updating the performance function by:
        generating a training error based on an expected value of the performance function and the transmission performance; and
        updating the performance function based on the training error and the observation parameters.

2. The method of claim 1, wherein:
    the motion indicator corresponds to a difference between consecutive channel state information measurements among the sequence of channel state information measurements.

3. The method of claim 1, wherein:
    the performance function includes a table of expected values ($Q_{ij}$) of transmission performance indexed by respective <motion indicator $m_i$ candidate transmission parameter ($p_j$)>tuples; and
    the selecting includes selecting, based on the table, the transmission parameter corresponding to a maximum one of the expected values $Q_{ij}$ of the transmission performance that is indexed by the motion indicator as determined.

4. The method of claim 3, wherein:
the updating includes updating in the table the expected value of transmission performance indexed by <the motion indicator $(m_i)$ as determined, the candidate transmission parameter $(p_j)$>tuple as a function of the transmission performance.

5. The method of claim 1, wherein:
the performance function includes a neural network-based performance function (DNN) that generates the expected values of transmission performance based on the observation parameters, wherein each of the expected values of transmission performance is associated with a respective transmission parameter; and
the selecting includes selecting the respective transmission parameter associated with a maximum one of the expected values of the transmission performance.

6. The method of claim 5, wherein:
the updating includes updating the neural network-based performance function (DNN) by:
updating the neural network-based performance function using a gradient method based on the training error and the observation parameters.

7. The method of claim 1, wherein:
the selecting includes using a policy function that probabilistically maps the observation parameters to a recommended choice of the candidate transmission parameters that represents the transmission parameter.

8. The method of claim 1, further comprising:
determining whether to select the transmission parameter using the learning-based algorithm or without using the learning-based algorithm;
if it is determined to select the transmission parameter without using the learning-based algorithm, performing the selecting the transmission parameter without using the learning-based algorithm and without using the observation parameters; and
if it determined to select the transmission parameter using the learning-based algorithm, performing the selecting using the learning-based algorithm.

9. The method of claim 8, wherein:
the transmission parameter corresponds to an interval between channel state information sounding requests on which the sequence of channel state information measurements are based.

10. The method of claim 8, wherein:
the selecting the transmission parameter without using the learning-based algorithm and without using the observation parameters includes selecting an under-used one of the candidate transmission parameters as the transmission parameter.

11. The method of claim 1, wherein the selecting the transmission parameter includes selecting a combination of a modulation and coding (MCS) index, a spatial multiplexing mode, a channel bandwidth, a guard interval, and a forward error correction (FEC) code.

12. The method of claim 1, wherein the selecting the transmission parameter includes selecting a number of spatial streams for the client device.

13. The method of claim 1, wherein the selecting the transmission parameter includes selecting either to add the client device to a multi-user (MU) multiple-input and multiple-output (MIMO) (MU-MIMO) group or to add the client device to a single user (SU) MIMO (SU-MIMO) group.

14. The method of claim 1, wherein the transmission parameter includes a physical (PHY) layer or a link layer transmission parameter.

15. An apparatus comprising:
a radio to transmit packets to a client device over a communication channel used by the client device; and
a processor coupled to the radio and configured to perform operations to:
determine a motion indictor indicative of motion of the client device based on a sequence of channel state information measurements;
measure a signal-to-noise ratio (SNR) of the communication channel;
determine whether to select a transmission parameter using a learning-based algorithm or without using the learning-based algorithm;
when the learning-based algorithm is to be used:
select the transmission parameter among candidate transmission parameters using the learning-based algorithm based on observation parameters including the motion indicator, the SNR, and a device identifier for the client device;
employ the transmission parameter to transmit packets to the client device;
measure a transmission performance associated with the transmission parameter based on the transmit packets; and
update the learning-based algorithm based on the observation parameters and the transmission performance for a next pass through the determine, the select, the employ, and the measure operations; and
when the learning-based algorithm is not to be used, select the transmission parameter without using the learning-based algorithm.

16. The apparatus of claim 15, wherein the processor is configured to, when the learning-based algorithm is to be used:
select by selecting the transmission parameter to maximize a performance function that is dependent on the observation parameters and the transmission parameter; and
update by updating the performance function based on the observation parameters, the transmission parameter, and the transmission performance.

17. The apparatus of claim 15, wherein the processor is configured to, when the learning-based algorithm is to be used:
select using a policy function that probabilistically maps the observation parameters to a recommended choice of the candidate transmission parameters that represents the transmission parameter.

18. A non-transitory computer readable medium encoded with instructions that, when executed by a processor of an access point configured to transmit packets to a client device over a communication channel used by the client device, cause the processor to perform:
determining a motion indictor indicative of motion of the client device based on a sequence of channel state information measurements;
measuring a signal-to-noise ratio (SNR) of the communication channel;
determining whether to select a transmission parameter using a learning-based algorithm or without using the learning-based algorithm;

when the learning-based algorithm is to be used:
- selecting the transmission parameter among candidate transmission parameters using the learning-based algorithm based on observation parameters including the motion indicator, the SNR, and a device identifier for the client device;
- employing the transmission parameter to transmit packets to the client device;
- measuring a transmission performance associated with the transmission parameter based on the transmit packets; and
- updating the learning-based algorithm based on the observation parameters and the transmission performance for a next pass through the determining, the selecting, the employing, and the measuring; and when the learning-based algorithm is not to be used, selecting the transmission parameter without using the learning-based algorithm.

19. The non-transitory computer readable medium of claim 18, wherein, when the learning-based algorithm is to be used:
- the instructions to cause the processor to perform the selecting include instructions to cause the processor to perform selecting the transmission parameter to maximize a performance function that is dependent on the observation parameters and the transmission parameter; and
- the instructions to cause the processor to perform the updating include instructions to cause the processor to perform the updating the performance function based on the observation parameters, the transmission parameter, and the transmission performance.

20. The non-transitory computer readable medium of claim 18, wherein, when the learning-based algorithm is to be used:
- the instructions to cause the processor to perform the selecting include instructions to cause the processor to perform the selecting using a policy function that probabilistically maps the observation parameters to a recommended choice of the candidate transmission parameters that represents the transmission parameter.

* * * * *